United States Patent [19]

Argyropoulos et al.

[11] Patent Number: 5,442,023
[45] Date of Patent: Aug. 15, 1995

[54] HINDERED-HYDROXYL FUNCTIONAL (METH)ACRYLATE MONOMERS CONTAINING DI(METH)ACRYLATES AND COMPOSITIONS INCLUDING SAME

[75] Inventors: John N. Argyropoulos, Scott Depot; Molly I. Busby, Charleston, both of W. Va.

[73] Assignee: Union Carbide Chemicals & Plastics Technology Corporation, Danbury, Conn.

[21] Appl. No.: 268,273

[22] Filed: Jun. 30, 1994

[51] Int. Cl.$^6$ ............................................ C08F 220/10
[52] U.S. Cl. ................................ 526/320; 526/323.1; 526/323.2; 526/324; 526/325; 524/558
[58] Field of Search ............... 526/320, 323.1, 323.2, 526/324, 325; 524/558

[56] References Cited

U.S. PATENT DOCUMENTS 5,093,408  3/1992  Jung et al. ............................ 524/512
5,290,602  3/1994  Argyropoulos et al. ............ 427/421

FOREIGN PATENT DOCUMENTS 1092884  1/1965  United Kingdom .
1110033  8/1965  United Kingdom .

*Primary Examiner*—Tae H. Yoon
*Attorney, Agent, or Firm*—W. K. Volles; R. M. Allen

[57] ABSTRACT

This invention relates to hindered-hydroxyl functional (meth)acrylate monomers containing significant amounts of the corresponding di(meth)acrylates, and to compositions including same. The hindered-hydroxyl functional (meth)acrylate and di(meth)acrylate monomers do not require separation prior to polymerization and have utility in coating, adhesive, ink, and sealant compositions, as well as in other end uses.

6 Claims, No Drawings

HINDERED-HYDROXYL FUNCTIONAL (METH)ACRYLATE MONOMERS CONTAINING DI(METH)ACRYLATES AND COMPOSITIONS INCLUDING SAME

BACKGROUND OF THE INVENTION

This invention relates to hindered-hydroxyl functional (meth)acrylate monomers containing significant amounts of the corresponding di(meth)acrylate, and to copolymer compositions including the same. These hindered-hydroxyl functional (meth)acrylate monomers are particularly useful in preparing polymers that can be cured with a variety of crosslinking agents to prepare compositions including coatings, adhesives, inks, sealants and the like.

(Meth)acrylate monomers, this term including acrylates, which contain significant amounts of di(meth)acrylate are know to suffer from premature crosslinking or gel formation during subsequent polymerization.

Typically, hindered-hydroxyl functional (meth)acrylate monomers are prepared by (i) direct esterification of a diol compound with methacrylic acid or acrylic acid, (ii) reaction of a diol compound with methacrylic anhydride or acrylic anhydride, and (iii) transesterification of a diol compound with alkyl methacrylate or alkyl acrylate. When the hydroxyl functional (meth)acrylate monomers are prepared, it is difficult to separate the starting diol from the various acrylates formed because both the starting diol and monomeric isomers have similar boiling points. To circumvent this difficulty, it is known in the art to carry the reaction to a higher degree of completion to minimize the amount of unreacted diol in the final reaction mass. However, this also increases the amount of what was considered undesirable di(meth)acrylate in the final product; which must be removed by distillation to prevent premature crosslinking during subsequent polymerization.

Applicants have discovered that when the (meth)acrylate involved is sterically hindered, the presence of significant amounts of di(meth)acrylate does not result in gel formation during polymerization. This discovery significantly reduces the cost of production of these type of monomers by eliminating the added step of separating the normally desirable mono(meth)acrylates from any di(meth)acrylate that may be present.

The present invention allows for preparation of (meth)acrylate copolymers from hindered-hydroxyl (meth)acrylates having di(meth)acrylate contents significantly above those known in the prior art, without premature crosslinking or gel formation.

SUMMARY OF THE INVENTION

This invention relates in part to copolymers comprising the reaction product of (a) one or more hindered-hydroxyl functional (meth)acrylate monomers containing from about 5 weight percent to 25 weight percent of the corresponding di(meth)acrylates, and (b) at least one other monomer copolymerizable therewith. These copolymers have (i) a number average molecular weight of less than about 12,000, preferably less than about 10,000 and most preferably less than about 7500 and (ii) a glass transition temperature of from $-30°$ C. to about $100°$ C., preferably from about $-20°$ C. to about $65°$ C., and most preferably from about $0°$ C. to about $45°$ C.

This invention also relates in part to compositions comprising (a) the copolymer described above, and (b) a crosslinking agent; along with other optional ingredients. Such compositions include, for example, coatings, adhesives, inks, sealants and the like.

This invention further relates in part to a method of protecting a surface from corrosion when exposed to a hostile environment, e.g., an acidic or alkaline environment, which comprises applying to the surface a composition described above, and curing said composition.

DETAILED DESCRIPTION OF THE INVENTION

As used herein, the term "(meth)acrylate," refers to both acrylate and methacrylate polymers and both oligomers of relatively low molecular weight copolymers, copolymers of relatively high molecular weight, and high molecular weight polymers thereof. The term "copolymer" is contemplated to include oligomers and polymers.

Suitable hindered-hydroxyl functional (meth)acrylate di(meth)acrylate-containing monomers can be prepared, for example, by (i) direct esterification of appropriate diol compound with methacrylic acid or acrylic acid, (ii) reaction of appropriate diol compound with methacrylic anhydride or acrylic anhydride, and (iii) transesterification of appropriate diol compound with alkyl methacrylate or alkyl acrylate, e.g., methyl methacrylate, methyl acrylate, ethyl methacrylate, ethyl acrylate, propyl methacrylate, propyl acrylate, and the like. Such preparation procedures are described in copending U.S. patent application Ser. No. 07/962,559, incorporated herein by reference.

Illustrative hindered-hydroxyl functional (meth)acrylate monomers useful in this invention include, for example, 2-ethyl-3-hydroxyhexyl methacrylate, 1-propyl-2-ethyl-3 hydroxypropyl methacrylate, 1-ethyl-2-methyl-3-hydroxypropyl methacrylate, 2-methyl-3-hydroxypentyl methacrylate, 2,2,4-trimethyl-3-hydroxypentyl methacrylate, 2-propyl-3-hydroxyheptyl methacrylate, 1-butyl-2-propyl-3-hydroxypropyl methacrylate, 2-ethyl-3-hydroxyheptyl methacrylate, 1-butyl-2-ethyl-3-hydroxypropyl methacrylate, 2-propyl-3-hydroxypropyl methacrylate, 2-ethyl-3-hydroxypropyl methacrylate, 1-i-butyl-2-i-propyl-3-hydroxypropyl methacrylate, 2-i-propyl-3-hydroxy-5-methylhexyl methacrylate, 1-methyl-2-i-propyl-3-hydroxypropyl methacrylate, 2-i-propyl-3-methyl-3-hydroxypropyl acrylate, 1-i-butyl-3-hydroxypropyl methacrylate, 3-hydroxy-5-methylhexyl methacrylate, 1-methyl-2-butyl-3-hydroxypropyl methacrylate, 2-butyl-3-hydroxybutyl methacrylate, 1-i-propyl-2,2-dimethyl-3-hydroxypropyl methacrylate, 2,4-dimethyl-2-ethyl-3-hydroxyhexyl methacrylate, and the like. Preferred hindered-hydroxyl functional (meth)acrylate monomers useful in this invention are obtained from 2,2,4-trimethyl-1,3-pentanediol, 2-methyl-1,3-pentanediol, 2-ethyl-1,3-hexanediol and 2,4-dimethyl-2-ethyl-1.3-hexanediol.

Preparation of the above hindered-hydroxyl functional (meth)acrylates will result in the corresponding di(meth)acrylates being present in the composition including, for example, 2-ethyl-1,3-hexanediol dimethacrylate, 1-propyl-2-ethyl-1,3-propanediol dimethacrylate, 1-ethyl-2-methyl-1,3-propanediol dimethacrylate, 2-methyl- 1,3-pentanediol dimethacrylate, 2,2,4-trimethyl-1,3-pentanediol dimethacrylate, 2-propyl-3-heptanediol dimethacrylate, 1-butyl-2-propyl-1,3-propanediol dimethacrylate, 2-ethyl-1,3-heptanediol dimethacrylate, 1-butyl-2-ethyl-1,3-propanediol dimethacrylate, 2-propyl- 1,3-propanediol dimethacrylate, 2-ethyl-1,3-propanediol dimethacrylate, 1-i-butyl-2-i-propyl-1,3-propanediol dimethacrylate, 2-i-propyl-5-methyl-1,3-hexanediol dimethacrylate, 1-methyl-2-i-propyl-1,3-propanediol dimethacrylate, 2-i-propyl-3-methyl-1,3-propanediol diacrylate, 1-i-butyl- 1,3-propanediol dimethacrylate, 3-hydroxy-5-methyl-1,3-hexanediol dimethacrylate, 1-methyl-2-butyl-1,3-propanediol dimethacrylate, 2-butyl-1,3-butanediol dimethacrylate, 1-i-propyl-2,2-dimethyl-1,3-propanediol dimethacrylate, and 2,4-dimethyl-2-ethyl-1,3-hexanediol dimethacrylate.

The hindered-hydroxyl functional (meth)acrylate monomers containing the corresponding di(meth)acrylates, produced by the processes described above can undergo further reaction(s) to afford desired derivatives thereof. Such permissible derivatization reactions can be carried out in accordance with conventional procedures known in the art. Illustrative derivatization reactions include, for example, esterification, etherification, alkoxylation, amination, alkylation, hydrogenation, dehydrogenation, reduction, acylation, condensation, carboxylation, carbamoylation, oxidation, silylation and the like, including permissible combinations thereof. This invention is not intended to be limited in any manner by the permissible derivatization reactions or permissible derivatives of hindered-hydroxyl functional (meth)acrylate di(meth)acrylate-containing monomers.

More particularly, the hindered-hydroxyl functional (meth)acrylate di(meth)acrylate-containing monomers of this invention can undergo any of the known reactions of hydroxyl groups illustrative of which are reactions with acyl halides to form esters; with ammonia, a nitrile, or hydrogen cyanide to form amines; with alkyl acid sulfates to form disulfates; with carboxylic acids and acid anhydrides to form esters and polyesters; with alkali metals to form salts; with ketones to form esters; with acid anhydrides to form carboxylic acids; with oxygen to form aldehydes and carboxylic acids; ring-opening reactions with lactones, tetrahydrofuran, and alkylene oxides such as ethylene oxide, propylene oxide, epichlorohydrin; dehydrogenation to form aldehydes, isocyanates to form urethanes, and the like.

Suitable other monomers copolymerizable with the hindered-hydroxyl functional (meth)acrylate monomers include one or more monoethylenically and/or multiethylenically unsaturated copolymerizable monomers, for example, one or more other (meth)acrylates, hydroxyalkyl (meth)acrylates, N-(alkoxymethyl)acrylamides such as N-(iso-butoxymethyl)-acryl-amide and N-methylol-acrylamide, vinyl compounds and the like. The other copolymerizable monomer can be the same as or different from the hindered-hydroxyl functional (meth)acrylate monomer.

Illustrative of the other (meth)acrylates include, for example, acrylic acid, methacrylic acid, the esters of acrylic and methacrylic acid such as the various methyl, ethyl, propyl, butyl, pentyl, hexyl, octyl, decyl, dodecyl, and the like acrylates including the various isomers of these and other listed compounds; bornyl, isobornyl, norbornyl and isonorbornyl acrylate; unsaturated carbamoyloxy carboxylates such as those described in U.S. Pat. No. 3,674,838; 3-methacryloxypropyltris(trimethyl-siloxy)silane and 3-acryloxypropyl-tris(trimethyl-siloxy)silane; dicyclopentenyl acrylate; hydroxyethyl acrylate, hydroxypropyl acrylate, hydroxyhexyl acrylates, hydroxy-decyl acrylates, caprolactone acrylates which are the product of reacting an e-caprolactone with a hydroxyalkylacrylate and which have both acrylate and hydroxyl functionality, including carbamoyl-oxyalkanoyloxyalkyl (meth)acrylates, ethoxylated and propoxylated acrylates which are the product of reacting an alkylene oxide, illustrative of which are ethylene oxide, propylene oxide, and the like, with an hydroxyalkylacrylate; cyclohexyl acrylate, 2-phenoxyethyl acrylate, glycidyl acrylate, and the like.

Illustrative vinyl compounds include, for example, styrene, vinyl cyclohexane, vinyl cyclohexene, vinyl cyclooctane, N-vinylpyrrolidone, vinyl pyridines, vinyl imidazole, vinyl naphthalene, acrylonitrile, methacrylonitrile, vinyl chloride, vinyl fluoride, vinyl bromide, vinylidine fluoride, vinylidine chloride, 5-vinyl-2norbornene and other vinyl norbornenes; vinyl esters such as vinyl acetate, vinyl trifluoroacetate, vinyl propionates, vinyl butyrates, vinyl pentanoates, vinyl 2-ethylhexanoate, vinyl nonanoates, vinyl decanoates, vinyl neonanoate, vinyl neco-decanoate, vinyl neopentanoate and the like; vinyl ethers such as vinyl alcohol which is formed by the hydrolysis of vinyl acetate, vinyl acetate, vinyl propionates, vinyl triethylene glycol and the like; vinyl acetic acid, 3-vinylbenzyl chloride, 4-vinylbiphenyl, vinyl carbazole, vinyl chloroformate, vinyl crotanate, vinyl trimethylsilane, vinyl trimethoxysilane, vinyl ferrocene, vinyl tributyltin, vinyl sulfonic acid, and the like. Included within the definition of vinyl compounds is maleic anhydride, maleic acid, and maleate esters and half esters.

As indicated above, the copolymers/oligomers of this invention have (i) a number average molecular weight of less than about 12,000, preferably less than about 10,000, and most preferably less than about 7500. These properties are important in that the compositions of this invention containing the hindered-hydroxyl functional (meth)acrylate/di(meth)acrylate copolymers can exhibit excellent physical characteristics such as water resistance, chemical resistance, resistance to hostile environments such as acid rain and air-borne chemicals, corrosion resistance, acid etch resistance, alkaline etch resistance, low surface tension, low viscosity that will allow higher application solids to be achieved and maintain or improve final cured coating performance characteristics, and the like.

The copolymers of this invention can be prepared by conventional free-radical, chain-transfer polymerization techniques which are well known to those skilled in the art. Chain transfer agents are compounds such as the alkyl mercaptans illustrative of which is tertiary-dodecyl mercaptan and the like; hydroxyl containing compounds such as alcohols including propanol, isopropanol, butanols, pentanol, hexanol; diols including ethylene glycol, 1,3-propanediol, 1,4-butanediol, 2,3-butanediol, pentanediols, hexanediols, and diols described herein; hydroxyl alkyl acrylates as described herein; and the like. When used, chain transfer agents are present in an amount up to about 5 percent by weight or greater based on weight of the free-radical polymerizable monomers.

The copolymers/oligomers of this invention can be prepared by a variety of polymerization techniques illustrative of which are solution polymerization, aqueous emulsion, dispersion, or suspension polymerization, bulk polymerization, nonaqueous emulsion, dispersion, or suspension polymerization, and the like. Said polymerizations can be effected in a variety of reactors illustrative of which are stirred batch reactor, tubular reactors, and the like and can be made of various materials of construction all of which are known to those skilled in the art of conducting such polymerizations.

In a particular embodiment of this invention, the hindered-hydroxyl functional (meth)acrylate monomers containing the corresponding di(meth)acrylates are prepared by the following process. This process is particularly useful because when the hindered-hydroxyl functional (meth)acrylate monomer described is prepared, it is difficult to separate the starting diol from the various acrylates formed. This is because both monomeric isomers and the diol have very similar boiling points. To circumvent this difficulty, the reaction is usually carried to a high degree of completion that will minimize the amount of unreacted diol in the final reaction mass; and increase the amount of di(meth)acrylate present in the final product. It has been surprisingly found that the heretofore required step of removing the di(meth)acrylate by distillation is not required and that the presence of the di(meth)acrylate component in amounts of from about 5 weight percent up to about 25 weight percent or higher does not cause premature crosslinking during subsequent preparation of the copolymers of the present invention.

In the process of the present invention, the appropriate diol used to prepare the hindered-hydroxyl functional (meth)acrylate monomer is allowed to react with (meth)acrylic anhydride, (meth)acrylic acid, or lower alkyl(meth)acrylate in an approximately one mole ratio to give from about 80% to about 95% conversion of the diol to the appropriate mono(meth)acrylate and di(meth)acrylate. This mixture is then combined with one or more monomers copolymerizable with the hindered-hydroxyl functional (meth)acrylate, and the polymerization to the copolymer/oligomer of the invention is carried out.

In a particular embodiment of this invention, the hindered-hydroxyl functional copolymers of the invention are modified by reacting all or a portion of the hydroxyl groups pendant on the polymer with a monoisocyanate including cyanic add and cyanogen chloride to form carbamoyloxyalkanoyloxyalkyl containing copolymers. Included in the hydroxyl groups that can be modified are the hindered hydroxyl groups and those introduced by means of other copolymerizable ethylenically unsaturated monomers such as hydroxyethyl (meth)acrylate, hydroxypropyl (meth)acrylates, the caprolactone acrylates all of which are mentioned above and vinyl alcohol that can be obtained by hydrolysis of vinyl acetate or other vinyl esters, and the like. To form these copolymers, the copolymers of the invention are reacted with monoisocyanates in which the reaction between the hydroxyl group and isocyanate may be represented as

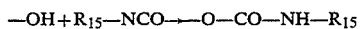
—OH+R$_{15}$—NCO→—O—CO—NH—R$_{15}$ wherein R$_{15}$ is hydrogen or a substituted or unsubstituted monovalent hydrocarbon residue. It is preferred that the modification be carried out in the absence of solvents or other compounds that contain hydroxyl groups which groups would interfere with the desired isocyanate/hydroxyl reaction. If desired, said modification can be carried out on the hindered hydroxyl functional (meth)acrylate prior to copolymerization with the other ethylenically unsaturated monomers.

Suitable isocyanates are hydrogen and substituted or unsubstituted monovalent hydrocarbon monoisocyanates illustrative of which are cyanic acid, methyl isocyanate, ethyl isocyanate, propyl isocyanates, butyl isocyanates, pentyl isocyanates, hexyl isocyanates, heptyl isocyanates, octyl isocyanates, nonyl isocyanates, decyl isocyanates, and higher hydrocarbon isocyanates, chloroethyl isocyanate, chlorobutyoxypropyl isocyanate, phenyl isocyanate, o-, m-, and p- chlorophenyl isocyanates, benzyl isocyanate, naphthyl isocyanate, p-ethylphenyl isocyanate, di-chlorophenyl isocyanates, and the like. The monoisocyanates can be used alone or in admixture to modify the copolymers/oligomers of the invention.

The compositions of this invention are comprised of (a) from about 10 weight percent or less to about 90 weight percent or greater, preferably from about 40 weight percent to about 90 weight percent, of the copolymer of this invention, and (b) from about 10 weight percent or less to about 90 weight percent or greater, preferably from about 10 weight percent to about 60 weight percent of a suitable crosslinking agent; along with optional ingredients. The compositions of this invention can be produced by conventionally formulating the hindered-hydroxyl functional (meth)acrylate-containing copolymers of this invention with one or more of a variety of crosslinking agents and optional ingredients as described below.

Illustrative crosslinking agents suitable for crosslinking the compositions of this invention include, for example, the aminoplasts, the multifunctional isocyanates, phenolics, cycloaliphatic epoxides, glycidyl epoxides; carbodiimides and polycarbodiimides, which can be used when the copolymer contains carboxylic add or other acidic functionality; and the like. When they will not interfere with each other, mixtures of the various classes or particular crosslinking agents can be used.

To obtain maximum etch resistance, when the copolymer/oligomer containing hindered-hydroxyl functional acrylates is used said copolymer/oligomer should have an oxygen content of less than about 25 weight percent and when aminoplast crosslinking agents are used, it is preferred that said aminoplasts contain about 90% or more alkylation and when isocyanate crosslinking agents are used, it is preferred that triisocyanates are used and most preferred that triisocyanates containing some cyclic ring structure are used.

Illustrative aminoplast crosslinking agents include, for example, alkoxymelamines, melamine-formaldehydes, urea-formaldehydes, alkylated benzoguanimines, guanyl ureas, guanidines, biguanidines, polyguanidines, and the like including mixtures of these compounds. Illustrative of specific compounds are hexamethoxymethylmelamine, methylated melamine, butylated melamine, methylated/butylated melamine, butylated urea, benzoguanidine, and the like.

Illustrative multifunctional isocyanate crosslinking agents include, for example, 4,4'-diphenylmethane diisocyanate, 4,4'-dicyclohexyl diisocyanate, 2,4- and 2,6-toluene diisocyanate, isophorone diisocyanate, xylidiene diisocyanate, meta- and para-tetramethylxylene diisocyanate, hexamethylene diisocyanate, 2,2,4- and 2,4,4- trimethylenehexamethylene diisocyanate, 4,4',4''-triisocyanato triphenylmethane, hexamethylene diisocyanate, biurets of hexamethylene diisocyanate with an average functionality greater than 2, and the like. The particular isocyanates can be used in a nascent or a blocked form with the latter type being preferred when a one-package system with maximized pot life/shelf life is desired.

The phenolic crosslinking agents useful in the practice of this invention include, for example, the soluble, heat-reactive phenols or resoles such as those described in T. S. Carswell, *Phenoplasts*, pages 9–29, Interscience Publishers Inc., New York (1947) and in J. A. Brydson, *Plastics Materials*, pages 385–386, D. Van Nostrand Co. Inc., New Jersey (1966). Illustrative of the soluble, heat-reactive phenolic crosslinking agents are monomers and polymers of alkylated phenol-formaldehyde, alkylated cresol-formaldehyde, including methylated phenol-formaldehyde, butylated phenolformaldehyde, cresol-formaldehyde, and the like as well as the various heat reactive phenolics made by reacting phenol, propyl phenols, butyl phenols, amyl phenols, and/or higher hydrocarbon phenols, o-, m-, and p- cresol, xylenols, and the like, with formaldehyde in the presence of a suitable catalyst such as ammonia, ethylamine, triethylamine, as well as other phenols which are known in the art of making heat reactive phenolics.

Illustrative cycloaliphatic epoxide crosslinking agents include, for example, 3,4-epoxy-cyclohexylmethyl 3,4-epoxycyclohexane carboxylate, 3,4-epoxy-6-methyl-cyclohexylmethyl 3,4-epoxy-6-methylcyclohexanecarboxylate, vinyl cyclohexane diepoxide, cyclohexane diepoxide, cyclopentadiene diepoxide, limonene diepoxide, V-pinene diepoxide, 3,4-epoxycyclohexyl-5,5-spiro-3,4-epoxycyclohexane m-dioxane, bis(3,4-epoxycyclohexylmethyl) adipate, and the like. Although polyfunctional cycloaliphatic epoxides are preferred as crosslinking agents, small amounts of up to about 25% of monoepoxides can be used in the formulation for such purposes as viscosity reduction. Illustrative of the monoepoxides are limonene monoepoxide, V-pinene monoepoxide, vinyl 3,4-epoxycyclohexane, norbornene monoepoxide, cyclohexane monoepoxide, 3,4-epoxy derivatives of alkoxylated and/or lactone derivatives of tetrahydrobenzyl alcohol, and the like.

Illustrative of the glycidyl epoxide crosslinking agents are the diglycidyl ether of bisphenol A, higher homologs of the diglycidyl ether of bisphenol A, diglycidyl ethers of brominated bisphenol A, 1,4-butanediol diepoxide, epoxy esters, epoxy silanes, epoxy siloxanes, epoxy novolacs, and the like.

In an embodiment of this invention, a copolymer containing an N-(alkoxymethyl)acrylamide such as N-(isobutoxymethyl)acrylamide is used as a crosslinking agent for the hindered-hydroxyl functional (meth)acrylate-containing copolymers of this invention. Thus, a copolymer can be prepared from (a) an N-(alkoxymethyl)acrylamide and (b) one or more monomers copolymerizable therewith. This copolymer can be combined with any of the copolymers of this invention and optionally an acidic catalyst to prepare coating compositions as described herein.

The formulated, uncured compositions containing the copolymers of the invention and cycloaliphatic epoxides can be cured with ultraviolet light when suitable photoinitiators are included in the formulation. The photoinitiators that can be used are of the onium salt type. The ratio of copolymer to cycloaliphatic epoxide can vary broadly in the photocurable compositions, since a wide variety of hard or soft coatings can be made. However, it is preferred that from about 1 to about 50 parts of the copolymer and from about 50 to 99 parts of the cycloaliphatic epoxide be used in the compositions, and more preferred from about 1 to about 30 parts of the copolymer and from about 70 to about 99 parts of the cycloaliphatic epoxide be used. If desired, polyols can be added to the formulation as well as surfactants and acrylates, particularly multifunctional acrylates. Illustrative of the polyols that can be used include poly-e-caprolactone polyols, polyester polyols, polyoxypropylene polyols, poly(oxy-propylene/oxyethylene) polyols, polyoxyethylene polyols, polycarbonate polyols, poly(tetramethylene oxide) polyols, ethylene glycol, 1,4-butanediol, 2-ethyl-3-propyl-1,5-pentanediol, 1,6-hexanediol, and the like. Illustrative of the acrylates that can be used include 2-ethyl hexyl acrylate, trimethylolpropane triacrylate, 1,6-hexanediol diacrylate, ethoxylated trimethylolpropane triacrylate, propoxylated trimethylolpropane triacrylate, higher functional acrylates, and the like.

Illustrative of the onium salt photoinitiators useful in the photocurable coating compositions of this invention containing mixtures of the copolymers of the invention, cycloaliphatic epoxides, and optional ingredients one can mention one or more of a metal fluoroborate and a complex of boron trifluoride as described in U.S. Pat. No. 3,379,653; a bis(perfluoroalkylsulfonyl)methane metal salt, as described in U.S. Pat. No. 3,586,616; an aryl diazonium compound as described in U.S. Pat. No. 3,708,296; an aromatic onium salt of Group VIa elements as described in U.S. Pat. No. 4,058,400; an aromatic onium salt of Group Va elements as described in U.S. Pat. No. 4,069,055; a dicarbonyl chelate of a Group IIIa-Va element as described in U.S. Pat. No. 4,068,091; a thiopyrylium salt as described in U.S. Pat. No. 4,139,655; a Group VIb dement in an $MF_6$ anion where M is selected from phosphorous, antimony, and arsenic as described in U.S. Pat. No. 4,161,478; an arylsulfonium complex salt as described in U.S. Pat. No. 4,231,951; an aromatic iodonium complex salt and an aromatic sulfonium complex salt, as described in U.S. Pat. No. 4,256,828; and a bis(4-diphenylsulfonio)phenyl) sulfide-bis-hexafluorometallic salts such as the phosphate, arsenate, antimonate and the like as described by W. R. Watt and coworkers in *J. Polymer Sci.: Polymer Chem. Ed.*, 22, 1789 (1984). Preferred cationic photoinitiators include the arylsulfonium or aryliodonium complex salts, aromatic sulfonium or iodonium salts of halogen containing complex ions, and aromatic onium salts of Group II, V, and VI elements. Some of such salts are commercially available in a solution form as FX-512, thought to be any arylsulfonium hexafluorophosphate, from 3M Company, CYRACURE UVR-6990 and UVR-6974, arylsulfonium hexafluorophosphate and arylsulfonium hexafluoroantimonate, respectively, from Union Carbide Chemicals and Plastics Company Inc.; UVE-1014 and UVE-1016, arylsulfonium hexafluorophosphate and arylsulfonium hexafluoroantimonate, respectively, from General Electric Company, KI-85, thought to be bis(4-(diphenylsulfonio)phenyl)sulfide-bis-hexa-fluorophosphate, from Degussa AG; and SP-150 and SP-170, thought to be bis(4-(diphenylsulfonio)-phenyl) sulfide-bis-hexafluoro-phosphate and bis(4-( diphenylsulfonio )phenyl) sulfide-bis-hexafluoroantimonate, respectively, from Asahi Denka Kogyo K. K. The onium salt photoinitiators are used at a concentration of less than about 0.1 weight percent to about 10 weight percent, preferably at concentrations of about 0.3 weight percent to about 5 weight percent of the total composition.

It is preferable that a catalyst be used for curing or crosslinking of certain of the compositions of this invention. Illustrative catalysts for thermal curing of the coating compositions when aminoplasts and cycloaliphatic epoxides are used include, among others, p-toluene sulfonic add and its salts such as ammonium p-toluene sulfonate, diethylammonium sulfonate, diisopropylammonium p-toluene sulfonate, and the like; dodecylbenzene sulfonic add and its salts such as ammonium dodecylbenzene sulfonate, diethylammonium dodecylbenzene sulfonate, and the like; phosphoric add and its salts; dinonylnaphthalene sulfonic adds and their salts such as ammonium dinonylnaphthalene sulfonic acids, dipropylammonium dinonylnaphthalene sulfonic adds; diethylammonium dinonylnaphthalene sulfonic acids, and the like; boron trifluoride etherate; trimelletic acid; triflate add and its salts such as diethylammonium triflate, ammonium triflate, diisopropyl-ammonium triflate, and the like; and when isocyanates are used include, among others, zinc octanoate, stannous octanoate, dibutyltin dilaurate, amines, and the like. The triflate acid salts are particularly useful when cycloaliphatic epoxides are used as the crosslinking agents since they afford low temperature curing conditions to be used along with very good shelf stability at high solids. These catalysts are used in amounts of from about 0.02 weight percent to about 4 weight percent, preferably from about 0.05 weight percent to about 1.0 weight percent, and most preferably from about 0.1 weight percent to about 0.8 weight percent.

The compositions of this invention can be formulated to contain a variety of additives including antioxidants, ultraviolet light stabilizers; surfactants or other flow and leveling agents illustrative of which are silicone oils, acrylic polymers such as the Modaflow ® Polymers available from Monsanto Company, silicone/alkylene oxides, fluorocarbon surfactants, and the like; fillers, pigments, colorants, thickeners; reactive diluents; one or more inert solvents illustrative of which are toluene, pentyl propionate, 1,1,1-trichloroethane, ethoxyethyl acetate, propoxyethyl acetate, ethoxybutyl acetate, butyl acetate, methyl isobutyl ketone, mineral spirits, methyl ethyl ketone, methyl amyl ketone, xylene, and the like; inert polymers, waxes, adhesion promoters; slip agents illustrative of which are the silicone oils, powdered polytetrafluoroethylene and/or polyethylene and the like. The additives can be employed in conventional amounts known in the art.

The coating compositions of this invention can be applied and cured on a variety of substrates known to those skilled in the art of coatings technology. Illustrative of such substrates are steel, treated steel, tin-plated steel, galvanized steel, treated and untreated aluminum, glass, wood, paper, coated or printed paper, epoxy/fiberglass composites, polymers such as poly(ethylene terephthalate), poly(butylene terephthalate), treated polyethylene and polypropylene, vinyl film, vacuum or vapor deposited aluminum, gold, copper, silver, zinc, nickel, tin, and other metals, electroless nickel, copper-nickel alloys and the like, electrodeposited metals such as silver, copper, nickel, chromium, silver-copper alloys, and the like, glass-reinforced unsaturated-polyester/styrene products, and the like. Illustrative application methods include, for example, spraying, brushing, dipping, roll coating or other methods.

As indicated above, the compositions of this invention are useful as coatings, adhesives, inks, sealants and the like. The coating compositions of this invention include, for example, water-borne coatings, solvent-borne coatings, powdered coatings, colored coatings, clear coatings, and the like. The coating compositions of this invention are useful in a variety of applications including industrial, architectural, automotive, outdoor signs, outdoor furniture, appliance coatings, recreational vehicles, boats and the like. A particular attribute of the coating compositions of this invention is their durability in outdoor weathering, i.e., providing protection to substrates from various forms of corrosion and deterioration in a functional sense.

For purposes of this invention, the term "hydrocarbon" is contemplated to include all permissible compounds having at least one hydrogen and one carbon atom. In a broad aspect, the permissible hydrocarbons include acyclic and cyclic, branched and unbranched, carbocyclic and heterocyclic, aromatic and nonaromatic organic compounds which can be substituted or unsubstituted.

As used herein, the term "substituted" is contemplated to include all permissible substituents of organic compounds unless otherwise indicated. In a broad aspect, the permissible substituents include acyclic and cyclic, branched and unbranched, carbocyclic and heterocyclic, aromatic and nonaromatic substituents of organic compounds. Illustrative substituents include, for example, alkyl, alkyloxy, aryl, aryloxy, hydroxy, hydroxyalkyl, amino, aminoalkyl, halogen and the like in which the number of carbons can range from 1 to about 20 or more, preferably from 1 to about 12. The permissible substituents can be one or more and the same or different for appropriate organic compounds. This invention is not intended to be limited in any manner by the permissible substituents of organic compounds.

As used herein, the molecular weights were determined by gel permeation chromatography using polystyrene calibration standards.

Certain of the following examples are provided to further illustrate this invention.

Glossary of Terms

Aminoplast - A methylated/butylated melamine commercially available from Monsanto Company as Resimene ® 755.

Catalyst 1-t-amylperoxyacetate {Lupersol 555M60(60TS)}

Catalyst 2-2,5-dimethyl-2,5-di-(2-ethylhexanoyl-peroxy)hexane (Lupersol 256)

Catalyst 3-A 25% by weight solution of dodecylbenzene sulfonic acid in methanol.

Solvent 1-A 97/3 by weight mixture of butyl propionate and isobutanol.

Surfactant 1-A silicone-based surfactant marketed by OSi Specialties Inc. as SILWET TM L-77.

Surfactant 2-A silicone-based surfactant marketed by OSi Specialties Inc. as SILWET TM L-7001.

In the examples which follow, the cured compositions were evaluated according to one or more of the following procedures:

Gloss is determined at 20° and 60° by the procedure of ASTM D523-85.

Acid Etch Resistance—A Fini automatic transfer pipette is used to place a series of 50 micro-liter droplets of 15% sulfuric acid solution at approximately ¼-inch intervals in two rows along the length of one or more coated panels. Usually two panels are required to provide the length of surface needed to examine the temperature range of 40° to 100° C. that is achieved in the gradient temperature oven. Two rows of spots are used for duplication of the test. The coated panels are placed in an end-to-end position on the heating bank of a BYK Chemie gradient temperature oven and aligning the first spots with the #1 rod which is at 40° C. which results in the various spots being at temperatures that range to 100° C. The sulfuric acid solution droplets are allowed to contact the coating for various times at the indicated temperatures. After the desired heating time, the panels are removed from the gradient oven, cooled to room temperature, rinsed thoroughly with distilled water, lightly patted dry, and evaluated.

Evaluation is by examining the areas that had been covered with the droplets with a 10-power, lighted magnifier. The following are points of comparison observed and recorded for each coating.
  a) The lowest temperature spot area with a visible defect in the coating. A "visible defect" is the first sign of any blush, bubbling, yellowing, or other visible change.
  b) The lowest temperature spot with a severe defect. A "severe defect" is blistering or complete removal of the coating with the substrate visible. This latter factor means the acidic solution has cut through the coating to the substrate.

Pencil Hardness (ASTM D 3363 74): Pencil leads of increasing harness values are forced against the film coating surface in a precisely defined manner until one pencil lead cut through the surface of the film coating. The surface hardness is considered as the hardest pencil grade which just failed to cut through the film coating surface. The pencil leads, in order of softest to hardest, are reported as follows: 6B, 5B, 4B, 3B, 2B, B, HB, F, H, 2H, 3H, 4H, 5H, 6H, 7H, 8H, AND 9H.

Impact Resistance (Forward): A measure of the ability of a cured film coating to resist rupture from a falling weight. A Gardner Impact Tester using an eight-pound dart is used to test film coatings cast and cured on steel panels. The dart is raised to a given height in inches and dropped onto the coating side of the coated panel. The inches times pounds, designated inches-pounds, absorbed by the film without rupturing is recorded as the films forward impact resistance.

Impact Resistance (Reverse): Same description as above, except, the dart is dropped onto the uncoated side of the coated panel.

Solvent Resistance—Solvent resistance was measured as the number of solvent (methyl ethyl ketone) double rubs that were required to cut through the coating. To perform the test, the solvent-soaked cloth was rubbed back and forth with hand pressure. A rub back and forth was designated as one "double rub." If 300 rubs or more did not cut through the coating, the coating was recorded as 300+.

Viscosity is determined using a Brookfield Viscometer and viscosity standards, by the procedure described in ASTM D2196.

EXAMPLES

Monomer Preparations

Preparation A

A mixture of the isomers 2,2,4-trimethyl-3-hydroxy-pentyl methacrylate and 1-isopropyl-2,2-dimethyl-3-hydroxy-propyl methacrylate is prepared by placing 900 grams (6.17 moles) of 2,2,4-trimethyl-1,3-pentanediol (TMPD) in a four-neck, glass reaction flask equipped with a Therm-O-Watch temperature control device, a nitrogen inlet and outlet, a stirrer, and a feeding port. The TMPD is melted and dried by heating to 85° C. while flowing dry nitrogen through the reaction mass for about 2 hours. Then 2.0 grams of methoxyhydroquinone, 2.0 gram of phenothiazine, and 1,139 grams (7.4 moles) of freshly distilled methacrylic anhydride are added. While stirring and employing a nitrogen purge, 40.5 grams of distilled pyridine are added and the reaction mass is heated to and held at 40° C. for about 48 hours. Excess methacrylic anhydride is then quenched by first adding methanol and then washing with water. The mixture of mono(meth)acrylate monomers is separated from unreacted TMPD and di(meth)acrylate by-product by fractional distillation. Gas chromatography indicates that the distilled product contains about 2% unreacted TMPD, about 1% of the di(meth)acrylate and about 97% of the mono(meth)acrylate.

Preparation B

A mixture of the mono(meth)acrylate isomers 2,2,4-trimethyl-3-hydroxypentyl methacrylate and 1-isopropyl-2,2-dimethyl-3-hydroxy-propyl methacrylate, along with the expected di(meth)acrylate, 2,2,4-trimethyl-1,3-pentanediol dimethacrylate, is prepared by placing 900 grams (6.17 moles) of 2,2,4-trimethyl-1,3-pentanediol (TMPD) in a four-neck, glass reaction flask equipped with a Therm-O-Watch temperature control device, a nitrogen inlet and outlet, a stirrer, and a feeding port. The TMPD is melted and dried by heating to 85° C. while flowing dry nitrogen through the reaction mass for about 2 hours. Then 2.0 grams of methoxyhydroquinone, 2.0 gram of phenothiazine, and 1,139 grams (7.4 moles) of freshly distilled methacrylic anhydride are added. While stirring and employing a nitrogen purge, 40.5 grams of distilled pyridine are added and the reaction mass is heated to and held at 40° C. for about 48 hours. Excess methacrylic anhydride is then quenched by first adding methanol and then washing with water. Gas chromatography indicates that the mixture contains about 6% unreacted TMPD, about 14% of the di(meth)acrylate and about 80% of the mono(meth)acrylate.

Copolymer Preparations

Example 1—Comparative Example

A two liter round bottom reaction flask equipped with a mechanical stirrer, thermometer, two feed lines designated as A and B, and condenser is charged with 500 grams of Solvent 1 while maintaining a nitrogen atmosphere in the reaction flask. A nitrogen atmosphere is maintained throughout the process. The reaction flask is then heated to reflux (~140° C.). A mixture of monomers containing 375.0 grams of Preparation A monomers, 465.0 grams of isodecyl methacrylate, 630.0 grams of isobornyl methacrylate and 30.0 grams of methacrylic acid is added through feed line A and a mixture of 350 grams of Solvent 1 and 50.0 grams of Catalyst 1 is added through feed line B with both additions taking place over a 4 hour time period. After the additions are completed, feed line A is flushed with 75 grams of Solvent 1 and the reaction held at 140° C. for an additional 30 minutes. Then the reactor is cooled to 100° C., and a post high-temperature reaction addition of a mixture containing 5.0 grams of Catalyst 2 in 75 grams of Solvent 1 is added through feed line B over a period of 30 minutes, and the reaction is continued at 100° C. for 2 hours. The resulting transparent solution is cooled to room temperature and stored for analysis and other use.

The transparent solution has determined solids of 58.4 percent, viscosity of 770 cps, a number average molecular weight of 3763, a weight average molecular weight of 7600 and a polydispersity ($M_w/M_n$) of 2.0, as determined by gel permeation chromatography using polystyrene standards.

Example 2

Using the same general procedure described above in Example 1, a monomer mixture containing 90.0 grams of Preparation B monomers, 76.5 grams of isodecyl methacrylate, 127.5 grams of isobornyl methacrylate and 6.0 grams of methacrylic acid is added using feed line A and 10.0 grams of Catalyst 1 in 70.0 grams of Solvent 1 is added utilizing feed line B. Following a reaction sequence identical to Example 1, 0.9 grams of Catalyst 2 in 15.0 grams Solvent 1 is added and the reaction continued as in Example 1.

The resulting transparent solution has determined solids of 58.3 percent, viscosity of 797 cps, a number average molecular weight of 4175, a weight average molecular weight of 8514 and a polydispersity ($M_w/M_n$) of 2.0, as measured by gel permeation chromatography using polystyrene as standard.

Example 3

Using the procedure of Example 1, 90.0 grams of Preparation B monomers, 99.0 grams of 2-ethyl hexyl acrylate, 105.0 grams of cyclohexyl methacrylate, 6.0 grams of methacrylic acid is added using feed line A; and 10.0 grams of Catalyst 1 in 70.0 grams of Solvent 1 is added using feed line B. Following a reaction sequence identical to Example 1, 0.9 grams of Catalyst 2 in 15.0 grams Solvent 1 is added and the reaction continued as in Example 1.

The resulting transparent solution has determined solids of 57.1 percent, viscosity of 105 cps, a number average molecular weight of 2689, a weight average molecular weight of 4814 and a polydispersity of 1.8, as measured by gel permeation chromatography using polystyrene as standard.

Examples 2 and 3 show the effects of the presence of 2,2,4-trimethyl pentanediol dimethacrylate in copolymer compositions using two different comonomers. Virtually no viscosity or molecular weight ($M_w$) increases were observed when compared to Comparative Example 1.

Example 4

Using the procedure of Example 1, 75.0 grams of Preparation A monomers, 7.5 grams of ethylene glycol dimethacrylate, 85.5 grams of isodecyl methacrylate, 126.0 grams of isobornyl methacrylate, 6.0 grams of methacrylic acid is added using feed line A; and 10.0 grams of Catalyst 1 in 70.0 grams of Solvent 1 is added using feed line B. Following a reaction sequence identical to Example 1, 0.9 grams of Catalyst 2 in 15.0 grams solvent is added and the reaction continued as in Example 1.

The resulting transparent solution has determined solids of 60.8 percent, viscosity of 2490 cps, a number average molecular weight of 6259, a weight average molecular weight of 20962 and a polydispersity ($M_w/M_n$) of 3.4, as measured by gel permeation chromatography using polystyrene as standard.

Example 4 shows the results of spiking Comparative Example 1 with 2.5% of an ethylene glycol dimethacrylate, an unhindered di(meth)acrylate. The viscosity increased from 770 cps to 2490, and the molecular weight ($M_w$) increased almost three-fold, indicating some premature crosslinking of the copolymer. Higher quantities of these type of unhindered di(meth)acrylates would be expected to produce crosslinked polymers which could not be used in coating compositions.

Example 5

Using the procedure of Example 1, 150.0 grams of Preparation B monomers, 60.0 grams of isodecyl methacrylate, 84.0 grams of isobornyl methacrylate, 6.0 grams of methacrylic acid is added using feed line A; and 10.0 grams of Catalyst 1 in 70.0 grams of Solvent 1 is added using feed line B. Following a reaction sequence identical to Example 1, 0.9 grams of Catalyst 2 in 15.0 grams solvent is added and the reaction continued as in Example 1.

The resulting transparent solution has determined solids of 58.6 percent, viscosity of 1320 cps, a number average molecular weight of 4527, a weight average molecular weight of 10173 and a polydispersity ($M_w/M_n$) of 2.3, as measured by gel permeation chromatography using polystyrene as standard.

Example 6

Using the procedure of Example 1, 200.0 grams of Preparation B monomers is added using feed line A and 6.7 grams of Catalyst 1 in 46.7 grams of Solvent 1 is added using feed line B. Following a reaction sequence identical to Example 1, 0.6 grams of Catalyst 2 in 10.0 grams solvent is added and the reaction continued as in Example 1.

The resulting transparent solution has determined solids of 54.5 percent, viscosity of 1300 cps, a number average molecular weight of 5257, a weight average molecular weight of 16435 and a polydispersity of 3.1, as measured by gel permeation chromatography using polystyrene as standard.

Examples 5 and 6 show preparation of copolymers containing much higher levels of di(meth)acrylate than previously acceptable in (meth)acrylate copolymer compositions, with, surprisingly, very little premature crosslinking.

The following table summarizes the above copolymer composition properties:

TABLE I

| POLYMER COMPOSITION PROPERTIES | | | | | |
|---|---|---|---|---|---|
| Ex. | $M_n$ | $M_w$ | $M_w/M_n$ | Solids Wt. % | Viscosity (cps) |
| 1 | 3763 | 7600 | 2.0 | 58.4 | 770 |
| 2 | 4175 | 8514 | 2.0 | 58.3 | 797 |
| 3 | 2689 | 4814 | 1.8 | 57.1 | 105 |
| 4 | 6259 | 20962 | 3.4 | 60.8 | 2490 |
| 5 | 4527 | 10173 | 2.3 | 58.6 | 1320 |
| 6 | 5257 | 16435 | 3.1 | 54.5 | 1300 |

In order to evaluate the usefulness of coatings prepared with the copolymers of the present invention, the following tests were run:

Coating Composition Preparations

Three parts by weight of the (meth)acrylate polymers of Example 1-6 are formulated with one part by weight Aminoplast. To each mixture, 1.6% by weight of Catalyst 3, 0.5% by weight of Surfactant 1, and 0.5% by weight of Surfactant 2 are added. The ingredients are mixed well and the resultant liquid coatings applied to steel substrates by the draw-down rod method. Coated substrates are baked in a forced-air oven at 140° C. for 30 minutes.

The following table shows the performance properties of the above-described copolymer coating compositions formulated using hindered-hydroxyl functional (meth)acrylate di(meth)acrylate-containing copolymers:

TABLE II

| | POLYMER COATING PROPERTIES | | | | | |
|---|---|---|---|---|---|---|
| | EXAMPLE | | | | | |
| | 1 | 2 | 3 | 4 | 5 | 6 |
| Total Di(meth)acrylate Content (wt. %) | 0.25 | 4.3 | 4.3 | 2.75 | 7.1 | 14.0 |
| PROPERTY | | | | | | |
| Gloss 20°/60° | 86.5/ 95.0 | 85.5/ 95.2 | 85.6/ 95.2 | 86.3/ 96.1 | 86.1/ 95.5 | 84.9/ 95.4 |
| Acid Etch Visible/Severe | 72/91 | 70/78 | 75/83 | 72/80 | 71/79 | 69/78 |
| Pencil Hardness | HB/F | B | B | B | H | B |
| Solvent Resistance | 300+ | 300+ | 300+ | 300+ | 300+ | 300+ |
| Impact Forward/Reverse | 20/<5 | 55/5 | 15/<5 | 20/<5 | 15–20/<5 | 25/<5 |

We claim:

1. A copolymer comprising the reaction product of (a) one or more hindered-hydroxyl functional (meth)acrylate monomers containing from about 5 weight percent to about 25 weight percent of the corresponding di(meth)acrylates, and (b) at least one other monomer copolymerizable therewith, said copolymer having (i) a number average molecular weight of less than about 12,000, and (ii) a glass transition temperature of from −30° C. to about 100° C.

2. The copolymer of claim 1 in which the hindered-hydroxyl functional (meth)acrylate monomers are selected from the group consisting of 2-ethyl-3-hydroxyhexyl methacrylate, 1-propyl-2-ethyl-3-hydroxypropyl methacrylate, 1-ethyl-2-methyl-3-hydroxypropyl methacrylate, 2-methyl-3-hydroxypentyl methacrylate, 2,2,4-trimethyl-3-hydroxypentyl methacrylate, 2-propyl-3-hydroxyheptyl methacrylate, 1-butyl-2-propyl-3-hydroxy-propyl methacrylate, 2-ethyl-3-hydroxyheptyl methacrylate, 1-butyl-2-ethyl-3-hydroxypropyl methacrylate, 2-propyl-3-hydroxy-propyl methacrylate, 2-ethyl-3-butyl-3-hydroxypropyl methacrylate, 1-i-butyl-2-i-propyl-3-hydroxypropyl methacrylate, 2-i-propyl-3-hydroxy-5-methylhexyl methacrylate, 1-methyl-2-i-propyl-3-hydroxypropyl methacrylate, 2-i-propyl-3-methyl-3-hydroxypropyl acrylate, 1-i-butyl-3-hydroxypropyl methacrylate, 3-hydroxy-5-methylhexyl methacrylate, 1-methyl-2-butyl-3-hydroxypropyl methacrylate, 2-butyl-3-hydroxybutyl methacrylate, 1-i-propyl-2,2-dimethyl-3-hydroxypropyl methacrylate and 2,4-dimethyl-2-ethyl-3-hydroxyhexyl methacrylate.

3. The copolymer of claim 1 in which the corresponding di(meth)acrylates are selected from the group consisting of 2-ethyl-1,3-hexanediol dimethacrylate, 1-propyl-2-ethyl-1,3-propanediol dimethacrylate, 1-ethyl-2-methyl-1,3-propanediol dimethacrylate, 2-methyl-1,3-pentanediol dimethacrylate, 2,2,4-trimethyl-1,3-pentanediol dimethacrylate, 2-propyl-3-heptanediol dimethacrylate, 1-butyl-2-propyl-1,3-propanediol dimethacrylate, 2-ethyl-1,3-heptanediol dimethacrylate, 1-butyl-2-ethyl-1,3-propanediol dimethacrylate, 2-propyl-1,3-propanediol dimethacrylate, 2-ethyl-1,3-propanediol dimethacrylate, 1-i-butyl-2-i-propyl-1,3-propanediol dimethacrylate, 2-i-propyl-5-methyl-1,3-hexanediol dimethacrylate, 1-methyl-2-i-propyl-1,3-propanediol dimethacrylate, 2-i-propyl-3-methyl-1,3-propanediol diacrylate, 1-i-butyl-1,3-propanediol dimethacrylate, 3-hydroxy-5-methyl-1,3-hexanediol dimethacrylate, 1-methyl-2-butyl-1,3-propanediol dimethacrylate, 2-butyl-1,3-butanediol dimethacrylate, 1-i-propyl-2,2-dimethyl-1,3-propanediol dimethacrylate and 2,4-dimethyl-2-ethyl-1,3-hexanediol dimethacrylate.

4. The copolymer of claim 1 in which the hydroxyl functional (meth)acrylate monomer is 2,2,4-trimethyl-3-hydroxypentyl methacrylate and the corresponding di(meth)acrylate is 2,2,4-trimethyl-1,3-pentanediol dimethacrylate.

5. The copolymer of claim 1 in which the hydroxyl functional (meth)acrylate monomer is 2,4-dimethyl-2-ethyl-3-hydroxyhexyl methacrylate and the corresponding di(meth)acrylate is 2,4-dimethyl-2-ethyl-1,3-hexanediol dimethacrylate.

6. The copolymer of claim 1 in which the at least one other monomer copolymerizable with the hindered-hydroxyl (meth)acrylate monomer is selected from the group consisting of (meth)acrylates, hydroxyalkyl (meth)acrylates and vinyl compounds.

* * * * *